(12) United States Patent
Wolf

(10) Patent No.: US 8,586,147 B2
(45) Date of Patent: Nov. 19, 2013

(54) METHOD FOR PRODUCING A DIMENSIONALLY STABLE INSCRIPTION

(75) Inventor: Erhard Wolf, Stuttgart (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 518 days.

(21) Appl. No.: 12/608,454

(22) Filed: Oct. 29, 2009

(65) Prior Publication Data

US 2010/0123265 A1  May 20, 2010

(30) Foreign Application Priority Data

Nov. 15, 2008  (DE) .......................... 10 2008 057 530

(51) Int. Cl.
 B05D 1/18  (2006.01)
 B29C 59/00  (2006.01)
 B29C 45/00  (2006.01)
 B29C 71/00  (2006.01)

(52) U.S. Cl.
 USPC .......................... 427/431; 427/430.1; 264/129

(58) Field of Classification Search
 USPC ........................................................ 427/430.1
 See application file for complete search history.

(56) References Cited

U.S. PATENT DOCUMENTS 4,693,769 A * 9/1987 Fritz et al. ..................... 156/73.1
 2006/0237995 A1  10/2006 Huttenlocher

FOREIGN PATENT DOCUMENTS

| DE | 8813439 | 1/1989 |
| DE | 9319813 | 2/1994 |
| DE | 103 42 579 A1 | 7/2004 |
| DE | 10342579 | 7/2004 |
| DE | 103 18 790 A1 | 11/2004 |
| DE | 10 2005 019 685 A1 | 11/2006 |
| JP | 11309744 A * | 11/1999 |

OTHER PUBLICATIONS

Machine Translation of DE10342579.*
German Search Report.

* cited by examiner

Primary Examiner — David Turocy
(74) Attorney, Agent, or Firm — Gerald E. Hespos; Michael J. Porco; Matthew T. Hespos

(57) ABSTRACT

A three-dimensionally embossed inscription containing a plurality of interconnected letters is connected, for dimensional stability, to a holding frame during a manufacturing process via supporting elements. After the end of the machining and manufacturing processes, the inscription is separated from the holding frame and has a shape which corresponds to the connected shape on the holding frame.

6 Claims, 2 Drawing Sheets

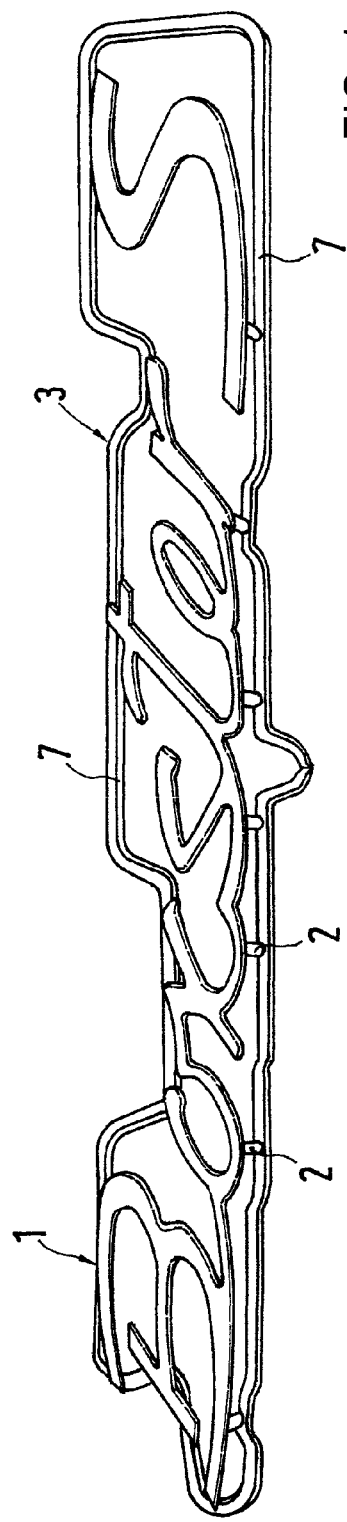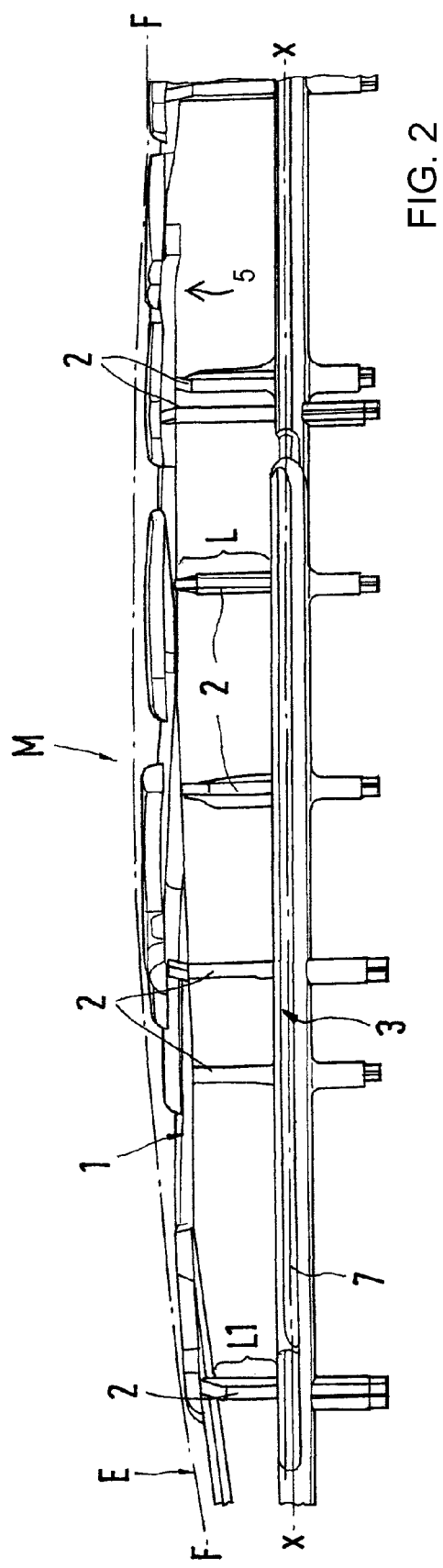

METHOD FOR PRODUCING A DIMENSIONALLY STABLE INSCRIPTION

CROSS-REFERENCE TO RELATED APPLICATION

This application claims the priority, under 35 U.S.C. §119, of German application DE 10 2008 057 530.5, filed Nov. 15, 2008; the prior application is herewith incorporated by reference in its entirety.

BACKGROUND OF THE INVENTION

Field of the Invention

The invention relates to a method for producing a dimensionally stable inscription formed from a plastic material for a motor vehicle in a manufacturing and machining process.

German utility model DE 93 19 813.2 U1 discloses a motor vehicle emblem or an inscription formed of plastic, which contains shaped-out letters which are chromium-plated on the visible side.

One problem in the production of an inscription containing interconnected letters and having a typographic line formed of plastic is that, in the manufacturing process and in a subsequent machining operation, such as, for example, chromium plating, component distortion may occur and therefore the dimensional stability of the inscription is not ensured as far as possible, and substantial reworking may become necessary.

SUMMARY OF THE INVENTION

It is accordingly an object of the invention to provide a method for producing a dimensionally stable inscription which overcomes the above-mentioned disadvantages of the prior art methods of this general type, which has connected letters and ensures three-dimensionally embossed dimensional stability throughout all the manufacturing and machining steps, without component distortion.

With the foregoing and other objects in view there is provided, in accordance with the invention a method for producing a dimensionally stable inscription formed of a plastic material for a motor vehicle in a manufacturing and machining process. The method includes the steps of: injection molding the inscription having a three-dimensionally embossed profile on a holding frame in a manufacturing process via supporting elements; chromium-plating the inscription supported on the holding frame in a subsequent machining process; and separating the inscription from the holding frame, and a separated inscription has a same three-dimensionally embossed profile as it had when connected to the holding frame.

The advantages mainly achieved by the invention are that the inscription is held by a holding frame via supporting elements. The holding frame ensures that the three-dimensionally embossed profile remains dimensionally stable throughout all the manufacturing steps. This is achieved in that the inscription has a three-dimensional embossed profile that is injection-molded in the manufacturing process on a holding frame via supporting elements, and, in a subsequent machining process, the inscription supported on the holding frame is chromium-plated, after which the inscription is separated from the holding frame by laser cutting and then has the same three-dimensionally embossed profile as it had on the connected holding frame. Furthermore, there is provision for the separation of the inscription from the holding frame to take place, flush with the inscription rear face, on the back side of the inscription.

In particular, the holding frame contains a continuous supporting web which is arranged in a flat plane and borders the inscription on the outside and from which the supporting elements extend upward to the individual interconnected letters and retain these in the three-dimensionally embossed profile. The supporting elements have a different length adapted to the three-dimensionally embossed profile of the inscription. By the inscription thereby being secured to the holding frame via the supporting elements in a three-dimensionally embossed position in the manufacturing process, interconnected letters are fixed exactly in position after removal from the die, so that warpings or component distortion are ruled out and a three-dimensional dimensional stability of the inscription remains ensured.

The inscription has letters with interruptions along the line, and tie-up points to the supporting elements are arranged directly adjacently to these interruptions and also at free ends of the letters and in the region of long connecting regions between the letters. The interconnected letters of the inscription have these long connecting webs with changing cross sections. By virtue of this special configuration of the inscription, it is necessary to place the supporting elements optimally on the letters of the inscription so that component distortion can be counteracted, and, without additional treatment of the inscription, the three-dimensional dimensional stability is maintained even after chromium plating.

So that an exact and invisible separation of the inscription from the tie-up points of the supporting elements of the holding frame occurs, the tie-up points of the supporting elements on the individual letters of the inscription are arranged so as to be offset inward from the outer margin of the letters.

The three-dimensionally embossed inscription according to the invention has a greater height with respect to the holding frame in the middle region than the outer end regions of the inscription, the latter being capable of being fastened via adhesive so as to bear on a motor vehicle face exactly matching the shape of the inscription. The inscription can therefore be placed, without additional treatment, onto the motor vehicle face matching the inscription.

The inscription according to the invention may also contain interconnected numerals or a combination of numerals and letters and is not restricted to an inscription containing only letters. The inscription "Boxster" or "Boxster S", used as an example, is a trademark of the company Porsche.

Other features which are considered as characteristic for the invention are set forth in the appended claims.

Although the invention is illustrated and described herein as embodied in a method for producing a dimensionally stable inscription, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a diagrammatic, top perspective view of an inscription with a holding frame connected via supporting elements according to the invention;

FIG. 2 is a side view of the inscription with the holding frame;

DETAILED DESCRIPTION OF THE INVENTION

Figure 3:
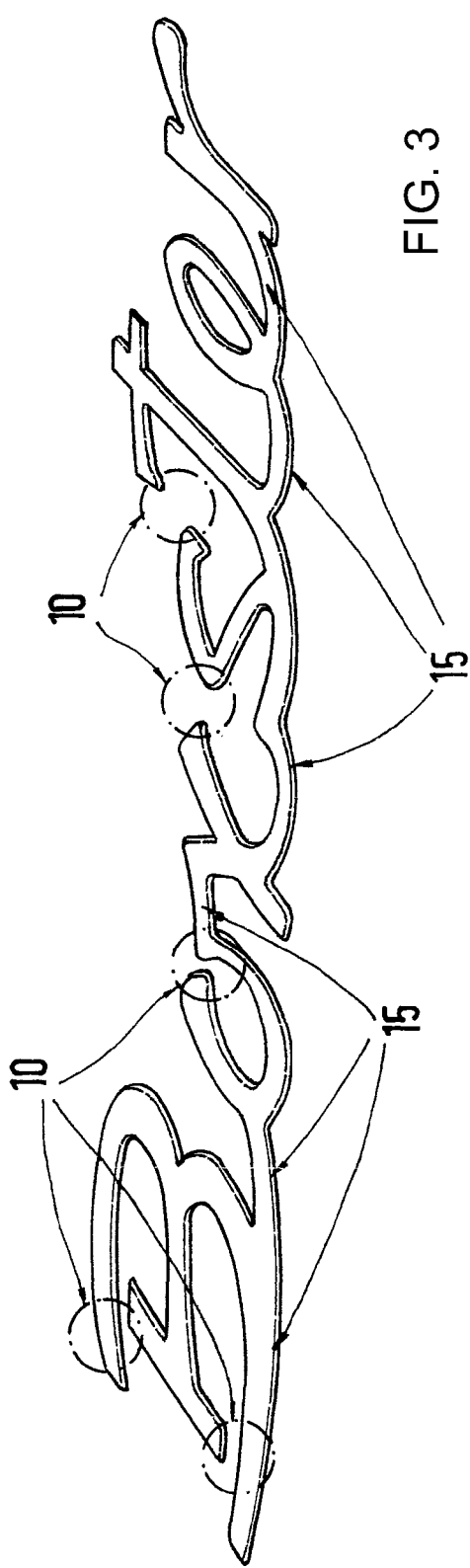
FIG. 3 is a top view of the inscription with interruptions along a line of letters.

Referring now to the figures of the drawing in detail and first, particularly, to FIGS. 1 and 2 thereof, there is shown an inscription 1 for a motor vehicle which is configured with a three-dimensionally embossed profile F-F and contains a plurality of interconnected letters formed from a plastic material. The inscription 1 is connected to a holding frame 3, preferably by an injection-molding method, during the manufacturing process via supporting elements 2, the three-dimensionally embossed profile F-F of the inscription 1 being secured via the supporting elements 2.

After the completion of the inscription 1 connected to the holding frame 3, a chromium plating of the inscription 1 or together with the holding frame 3 is carried out in a machining process. By the inscription 1 being secured to the holding frame 3, deformation during the pretreatment and during a subsequent chromium-plating process is avoided. The inscription 1 is thereafter separated from the holding frame 3. After separation, the inscription 1 has the same three-dimensionally embossed profile F-F as it had when connected to the holding frame 3 via the supporting elements.

The separation of the inscription 1 from the supporting elements 2 of the holding frame 3 takes place, flush with a rear face 5 of the inscription 1. In particular, for a neat separation of the supporting element 2 from the inscription 1, such supporting elements are arranged so as to be offset inward from an outer margin 6 of the individual letters of the inscription 1.

The holding frame 3 has a continuous supporting web 7 which is arranged in a flat plane x-x and which borders the inscription 1 on the outside. The pointed supporting elements 2 extend upward at right angles from the supporting web 7 and are connected to the individual letters of the inscription 1.

The supporting elements 2 are so arranged and connected singly or multiply to the individual letters of the inscription 1 that the latter maintains three-dimensional dimensional stability throughout all the manufacturing steps.

To support the three-dimensionally embossed inscription 1, the holding frame 3 has supporting elements 2 of different length L and L1 which are correspondingly adapted to the profile of the inscription 1. Thus, the inscription 1 is arranged in a middle region M at a greater height with respect to the holding frame 3, the outer end regions E of the inscription being at a shorter distance from the holding frame 3.

Figure 4:
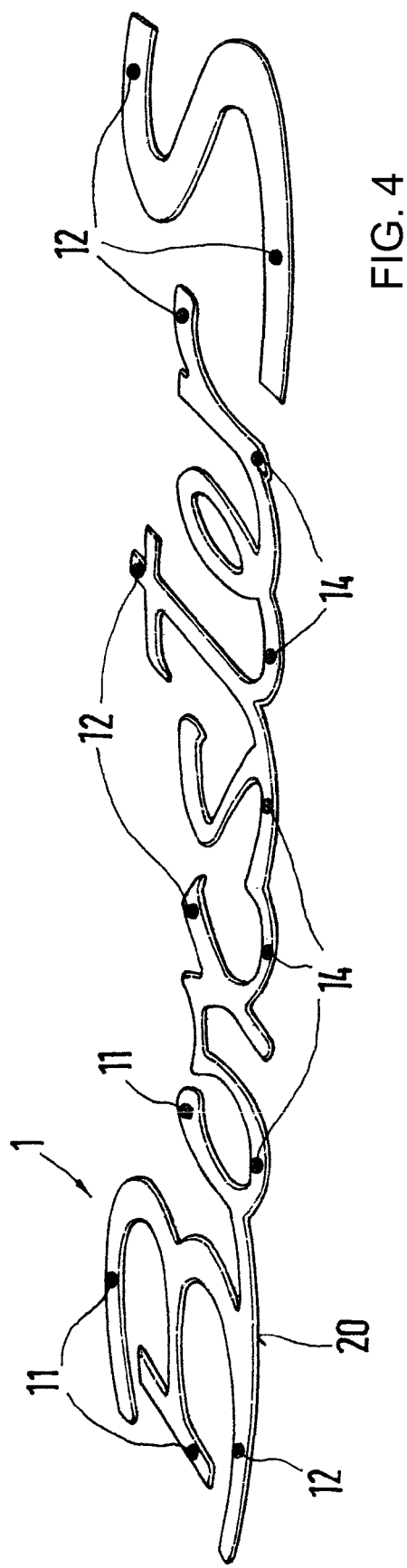
FIG. 4 is a top view of the inscription with tie-up points of the supporting elements on the inscription.

Since the inscription 1 has letters with interruptions 10 along the line, this being illustrated in more detail in FIG. 3, a supporting placement of tie-up points 11 preferably directly adjacently to the interruptions 10 and preferably at free ends 12 of the individual letters of the inscription 1 is selected, as is shown in more detail in FIG. 4. Further tie-up points 14 of the supporting elements 2 on the letters supplement the securing of the inscription 1, especially since the individual letters have long connecting webs 15 with changing cross sections.

The support of the three-dimensionally embossed inscription 1 formed of plastic on purposefully arranged supporting elements 2 of the holding frame 3 has the result, throughout all the manufacturing and machining processes, that a deformation of the inscription 1 is ruled out and the latter has the original profile F-F after the separation of the supporting elements 2.

The invention claimed is:

1. A method for producing a dimensionally stable non-planar inscription having a plurality of letters interconnected along a specified longitudinal direction, the letters being formed of a plastic material and mountable on a non-planar surface of a motor vehicle, the method comprising the steps of:

injection molding a three dimensional plastic matrix that includes the inscription with opposite front and rear surfaces, at least the rear surface having a specified non-planar three-dimensional profile conforming to the non-planar surface of a motor vehicle, a planar holding frame extending continuously around a periphery of the inscription and spaced rearward of the rear surface of the inscription, and a plurality of supporting elements extending from the holding frame to locations on the rear surface of the inscription offset inward from an outer margin of the inscription and being at different respective positions along the longitudinal direction, the supporting elements have lengths corresponding to respective distances between the planar holding frame and the non-planar inscription, surfaces of the supporting elements facing outward on the matrix being sloped continuously from the inscription to a location between the holding frame and the inscription so that the supporting elements have a smallest cross-section adjacent the inscription;

chromium-plating the inscription supported on the supporting elements and the holding frame; and separating the supporting elements from the rear surface of the inscription so that the inscription maintains the specified three-dimensional profile formed when injection molding the inscription with the supporting elements and the holding frame.

2. The method according to claim 1, wherein the step of injection molding a three dimensional plastic matrix comprises providing the supporting elements extending from the holding frame to the individual interconnected letters of the inscription.

3. The method according to claim 1, wherein the step of injection molding a three dimensional plastic matrix further comprises forming the inscription with at least two of the interconnected letters with interruptions along a line, and forming tie-up points of the supporting elements and the inscription directly adjacent to the interruptions, at free ends of the letters and in regions of long connecting webs between the letters.

4. The method according to claim 3, wherein the step of injection molding a three dimensional plastic matrix further comprises forming the long connecting webs with changing cross sections.

5. The method according to claim 1, wherein the step of injection molding a three dimensional plastic matrix further comprises forming the specified non-planar three-dimensional profile of the inscription with a greater height with respect to the holding frame in a middle region than outer end regions of the inscription, the rear surface of the inscription being configured to be fastened via adhesive on the non-planar surface of the motor vehicle exactly matching a shape of the rear surface of the inscription.

6. The method according to claim 1, wherein the step of injection molding a three dimensional plastic matrix further comprises molding the supporting elements so that at least one of the supporting elements is at a position between two of the interconnected letters.

* * * * *